US012165596B2

(12) United States Patent
Zhou et al.

(10) Patent No.: US 12,165,596 B2
(45) Date of Patent: Dec. 10, 2024

(54) PIXEL DRIVING CIRCUIT, DISPLAY PANEL AND CONTROL METHOD THEREOF

(71) Applicant: HKC CORPORATION LIMITED, Shenzhen (CN)

(72) Inventors: Renjie Zhou, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/744,511

(22) Filed: Jun. 14, 2024

(65) Prior Publication Data

US 2024/0339080 A1 Oct. 10, 2024

Related U.S. Application Data

(63) Continuation of application No. PCT/CN2022/142031, filed on Dec. 26, 2022.

(30) Foreign Application Priority Data

Aug. 4, 2022 (CN) ......................... 202210929800.6

(51) Int. Cl.
*G09G 3/3258* (2016.01)
*G09G 3/3266* (2016.01)
*G09G 3/3275* (2016.01)

(52) U.S. Cl.
CPC ......... *G09G 3/3258* (2013.01); *G09G 3/3266* (2013.01); *G09G 3/3275* (2013.01);
(Continued)

(58) Field of Classification Search
None
See application file for complete search history.

(56) References Cited

U.S. PATENT DOCUMENTS 9,330,617 B2 * 5/2016 Shin ........................ G09G 3/003
9,875,688 B2 * 1/2018 Han ...................... G09G 3/3233
(Continued)

FOREIGN PATENT DOCUMENTS

CN 103000126 A 3/2013
CN 103489399 A 1/2014
(Continued)

OTHER PUBLICATIONS

Cho et al., A Low-Power Digital Pixel Driving Scheme for Single-Pulse-PWM-Based Display Using and-Embedded Pixel Circuits, IEEE Transactions on Circuits and Systems for Video Technology, 2018, 22(4), pp. 1-11, dated Oct. 14, 2018.
(Continued)

*Primary Examiner* — Sepehr Azari
(74) *Attorney, Agent, or Firm* — Westbridge IP LLC

(57) ABSTRACT

Disclosed are a pixel driving circuit, a display panel and a control method thereof. The pixel driving circuit includes a signal generating module, an input terminal of the signal generating module is connected to a scan line, and the signal generating module is configured to generate a second scan signal according to a first scan signal, and the second scan signal is output from a first output terminal; and, a light-emitting driving module, a first controlled terminal, a second controlled terminal, a third controlled terminal of the light-emitting driving module are connected to the first output terminal of the signal generating module in one-to-one correspondence.

10 Claims, 6 Drawing Sheets

(52) U.S. Cl.
CPC . *G09G 2300/0842* (2013.01); *G09G 2310/08* (2013.01); *G09G 2320/0233* (2013.01)

(56) References Cited

U.S. PATENT DOCUMENTS

| | | | | |
|---|---|---|---|---|
| 10,223,964 | B2 * | 3/2019 | Han | G09G 3/3233 |
| 11,011,113 | B1 * | 5/2021 | Lu | G09G 3/3225 |
| 2007/0024542 | A1 | 2/2007 | Chung et al. | |
| 2007/0152929 | A1 * | 7/2007 | Chan | H05B 41/3927 345/87 |
| 2010/0253666 | A1 | 10/2010 | Yamamoto | |
| 2012/0306840 | A1 * | 12/2012 | Han | G09G 3/003 345/82 |
| 2013/0113687 | A1 * | 5/2013 | Lin | G09G 3/3233 345/76 |
| 2016/0203759 | A1 * | 7/2016 | Han | G09G 3/3233 345/212 |
| 2016/0307505 | A1 | 10/2016 | Tsuge et al. | |
| 2017/0031477 | A1 * | 2/2017 | Jamshidi Roudbari | G09G 3/3266 |
| 2017/0039954 | A1 | 2/2017 | Sun et al. | |
| 2017/0270867 | A1 | 9/2017 | Zhu et al. | |
| 2019/0156749 | A1 * | 5/2019 | Wang | G09G 3/3233 |
| 2019/0340975 | A1 | 11/2019 | Zhai | |
| 2020/0175913 | A1 | 6/2020 | Kang et al. | |
| 2021/0035524 | A1 * | 2/2021 | Chun | G09G 3/2092 |
| 2022/0020315 | A1 * | 1/2022 | Cok | H03K 3/017 |
| 2022/0059014 | A1 | 2/2022 | Kuo et al. | |
| 2023/0178570 | A1 * | 6/2023 | Zhou | G09G 3/32 345/55 |

FOREIGN PATENT DOCUMENTS

| | | | | |
|---|---|---|---|---|
| CN | 104064140 | A | 9/2014 | |
| CN | 104409043 | A | 3/2015 | |
| CN | 109147665 | A | 1/2019 | |
| CN | 110176214 | A | 8/2019 | |
| CN | 110556076 | A | 12/2019 | |
| CN | 111710298 | A | 9/2020 | |
| CN | 113707090 | A | 11/2021 | |
| CN | 113920935 | A * | 1/2022 | G09G 3/3225 |
| CN | 114627807 | A | 6/2022 | |
| CN | 114743501 | A | 7/2022 | |
| CN | 114822402 | A | 7/2022 | |
| CN | 115019729 | A | 9/2022 | |
| JP | 2009300753 | A | 12/2009 | |
| JP | 2020112803 | A | 7/2020 | |
| KR | 20200082964 | A | 7/2020 | |

OTHER PUBLICATIONS

First Office Action issued in counterpart Chinese Patent Application No. 202210929800.6, dated Sep. 14, 2022.

International Search Report and Written Opinion issued in corresponding PCT Application No. PCT/CN2022/142031, dated Apr. 20, 2023.

Notification to Grant Patent Right for Invention issued in counterpart Chinese Patent Application No. 202210929800.6, dated Sep. 27, 2022.

Wang et al., A Universal Driving Circuit Based on CPLD for Liquid Crystal Spatial Light Modulator, Journal of Zhengzhou University of Light Industry (Natural Science), 2008, 23(2), pp. 47-49, dated Apr. 15, 2008.

* cited by examiner

PIXEL DRIVING CIRCUIT, DISPLAY PANEL AND CONTROL METHOD THEREOF

CROSS-REFERENCE TO RELATED APPLICATIONS

This application is a continuation application of International Application No. PCT/CN2022/142031, filed on Dec. 26, 2022, which claims priority to Chinese Patent Application No. 202210929800.6, filed on Aug. 4, 2022. The disclosures of the above-mentioned applications are incorporated herein by reference in their entireties.

TECHNICAL FIELD

The present application relates to the technical field of display, and in particular to a pixel driving circuit, a display panel and a control method thereof.

BACKGROUND

Currently, self-luminous display panels, such as organic light-emitting diode (OLED) panels, have been widely used in electronic products such as mobile phones and notebooks due to their advantages such as high contrast. However, the driving circuit of the light-emitting module in the present self-luminous panel needs to be connected to multiple scan signals, and is affected by various driving algorithms, wiring technology, and thin-film transistor technology, so that the thin-film transistor in the light-emitting driving circuit will fail to be turned off in time, thereby affecting the luminous brightness of the light-emitting device and the display effect of the display panel.

SUMMARY

The main objective of the present application is to provide a pixel driving circuit.

In order to achieve the above objective, the present application provides the pixel driving circuit, applied to a display panel, the display panel including: a data line, a scan line, and a light-emitting module, the scan line is configured to access and transmit a first scan signal, and a source line is configured to access and transmit data signals, the pixel driving circuit includes a signal generating module, and a light-emitting driving module.

In an embodiment, an input terminal of the signal generating module is connected to the scan line, the signal generating module is configured to generate a second scan signal according to the first scan signal, and the second scan signal is output from a first output terminal.

In an embodiment, a first controlled terminal, a second controlled terminal, and a third controlled terminal of the light-emitting driving module are connected to the scan line, the data line, and a first output terminal of the signal generating module in one-to-one correspondence, an input terminal of the light-emitting driving module is configured to access a power supply voltage, and an output terminal of the light-emitting driving module is connected to the light-emitting module.

In an embodiment, the light-emitting driving module is configured to write the power supply voltage into the light-emitting module according to a received first scan signal, the second scan signal and the data signal, so as to drive the light-emitting module to emit light.

The present application further provides a method for controlling a display panel, including:

after determining that a pixel driving circuit enters a working phase, outputting a first scan signal at a first level, a second scan signal at a second level and a third scan signal at the first level to control the pixel driving circuit to enter an initial energy storage phase;

in response to a first signal edge of a first pulse signal being detected for the first time, switching to output the first scan signal at the second level, in response to a second signal edge of the first pulse signal being detected for the first time, switching to output the second scan signal at the first level, and in response to a first signal edge or a second signal edge of a second pulse signal being detected for the first time, switching to output the third scan signal at the second level to control the pixel driving circuit to enter a discharge phase;

in response to the first signal edge of the first pulse signal being detected for the second time, switching to output the first scan signal at the first level, in response to the second signal edge of the first pulse signal being detected for the second time, switching to output the second scan signal to control the pixel driving circuit to enter the discharge phase;

in response to the first signal edge of the first pulse signal being detected for the third time, switching to output the first scan signal at the second level, and in response to the second signal edge of the first pulse signal being detected for the third time, switching to output the second scan signal at the first level to control the pixel driving circuit to enter a light-emitting driving phase; and one of the first signal edge and the second signal edge is a rising edge, and another one of the first signal edge and the second signal edge is a falling edge.

The present application further provides a display panel, configured to realize a control method of the display panel, including: a light-emitting module, a pixel driving circuit connected to the light-emitting module, and a timing controller connected to four controlled terminals of the pixel driving circuit.

In an embodiment, the timing controller is configured to output a first scan signal, a second scan signal, a third scan signal and a data signal to the pixel driving circuit for controlling the pixel driving circuit to drive the light-emitting module to emit light.

The technical solution of the present application adopts a signal generating module and a light-emitting driving module, and makes the signal generating module process the first scan signal into the second scan signal required by the light-emitting driving circuit by turning on/off the switching device.

Since the turn-on and off of the switching device may effectively shorten the rising edge time and the falling edge time, compared with the first scan signal, the rising edge time and falling edge time of the second scan signal are shorter, thus reducing the probability that the rising edge time and the falling edge time of the first scan signal and the second scan signal are overlapped, and reducing the probability that the overlapped portion affects the luminous effect of the pixel unit, thereby solving the problem that the display effect of the display panel is affected since the thin film transistor (TFT) in the light-emitting drive circuit cannot be timely. Thus, the display effect and display stability of self-luminous panels such as OLED panels is improved.

Besides, since the signal generating module is provided in the pixel driving circuit, that is, in each pixel unit, compared with being provided in the gate driver, it may effectively avoid the subsequent distortion of the second scan signal caused by the transmission process of the scan line, which is beneficial to ensure that the light-emitting driving module in each pixel unit is connected to the second scan signal with a short rising/falling edge time output by the signal generating module.

In addition, since one channel of scan signal needs one scan line for transmission, the quantity of scan lines in the present self-luminous panel is at least 2N, where N is the quantity of rows of the pixel array, but only N lines of canning lines are required by the technical solution of this application to drive self-luminous panels with the same resolution. In other words, the technical solution of the present application may reduce the overall occupied area of the scan lines in the display panel, which is beneficial to the high-resolution design of the self-luminous panel.

BRIEF DESCRIPTION OF THE DRAWINGS

In order to more clearly illustrate the technical solutions in the embodiments of the present application or related art, the following is a brief description of the drawings for the description of the embodiments or related art, it is obvious that the drawings in the following description are only some of the embodiments of the present application, other structures may be obtained by those skilled in the art according to structures in these drawings without creative works.

The realization of the purpose, functional features and advantages of the present application will be further illustrated with reference to the drawings in conjunction with the embodiments.

DETAILED DESCRIPTION OF THE EMBODIMENTS

The technical solutions in the embodiments of the present application will be clearly and completely described below in conjunction with the drawings in the embodiments of the present application, and it is clear that the described embodiments are only some of the embodiments of the present application, and not all of them. Based on the embodiments in the present application, all other embodiments obtained by those skilled in the art fall within the scope of the present application without creative labor.

In addition, the descriptions such as "first" and "second" in the present application are for descriptive purposes only and are not to be construed as indicating or implying their relative importance or implicitly specifying the quantity of technical features indicated. Thus, the features defined with "first" and "second" may explicitly or implicitly include at least one such feature. In addition, the technical solutions of each embodiment may be combined with each other, but only on the basis that they may be achieved by those skilled in the art, when the combination of technical solutions appear to contradict each other or cannot be achieved, it should be considered that this combination of technical solutions does not exist, and is not within the scope of the present application.

The present application provides a pixel driving circuit 2, which may be applied to self-luminous display panels such as OLED panels.

The display panel 1 may include a plurality of scan lines L1 and a plurality of data lines L2, the plurality of scan lines L1 and the plurality of data lines L2 intersect each other to define a pixel array with a plurality of pixel units. Each scan line L1 is configured to access and transmit a channel of the scan signal output by the gate driver to control each pixel unit on the row to be turned on or off. Each data line L2 is configured to access and transmit a channel of the data signal DS output by the source driver, so that the data signal DS may be written by the pixel units at the column. Each pixel unit may be provided with a light-emitting module and a pixel driving circuit 2 electrically connected to each other. The light-emitting module may include at least one light-emitting diode luminous device, and the pixel driving circuit 2 is configured to drive the connected light-emitting module to emit light.

Figure 1:
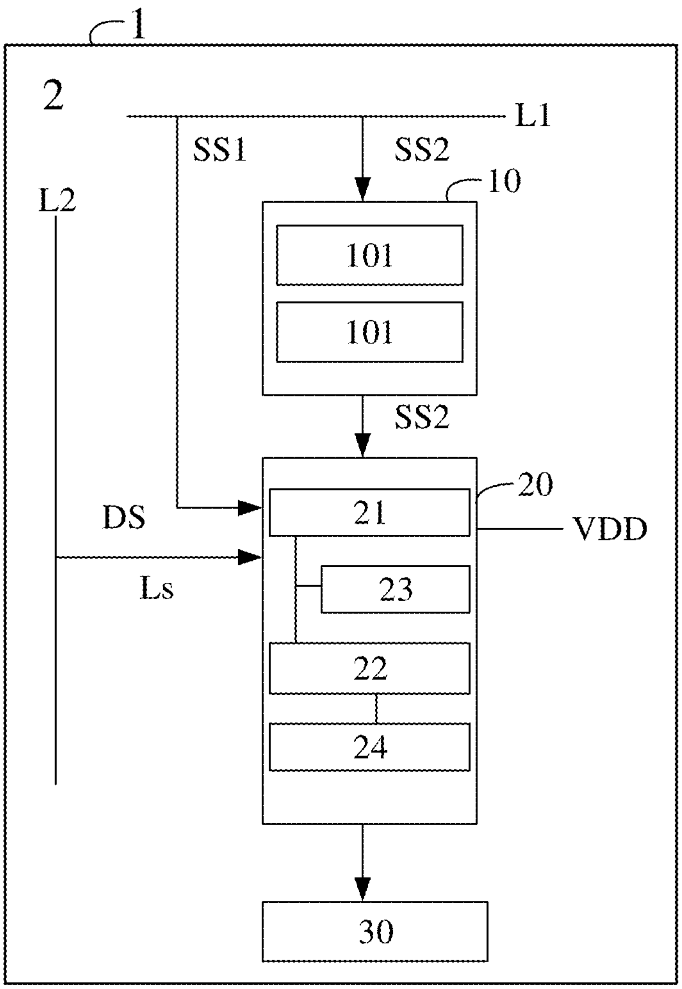
FIG. 1 is a schematic diagram of a module of a pixel driving circuit according to an embodiment of the present application.

As shown in FIG. 1, in an embodiment, the pixel driving circuit 2 includes: a signal generating module 10, and a light-emitting driving module 20.

An input terminal of the signal generating module 10 is connected to the scan line L1, the signal generating module 10 is configured to generate a second scan signal SS2 according to the first scan signal SS1, and the second scan signal SS2 is output from the first output terminal.

A first controlled terminal, a second controlled terminal, and a third controlled terminal of the light-emitting driving module 20 are connected to the scan line L1, the data line L2, and the first output terminal of the signal generating module 10 in one-to-one correspondence. The input terminal of the light-emitting driving module 20 is configured to access the power supply voltage VDD, and the output terminal of the light-emitting driving module 20 is connected to the light-emitting module 30.

The light-emitting driving module 20 is configured to write the power supply voltage VDD into the light-emitting module 30 according to the received first scan signal SS1, the second scan signal SS2 and the data signal DS, so as to drive the light-emitting module 30 to emit light.

In an embodiment, the signal generating module 10 may be constructed and realized by using a switching device. The switching device may be a MOS transistor, a TFT, a triode, etc., which is not limited here. The input terminal of the signal generating module 10 is provided to be connected to the scan line L1 corresponding to the pixel unit, so as to access the scan signal transmitted on the scan line L1, that is, the first scan signal SS1. The first scan signal SS1 may have a high level and a low level, and the signal generating module 10 may control the corresponding switching devices therein to turn on or off according to the level of the first scan signal SS1 to perform signal processing such as level inversion, level delay, and level selection on the accessed first scan signal SS1, and the first scan signal SS1 after signal processing may be output as a second scan signal SS2 from the first output terminal.

The light-emitting driving module 20 may be implemented by using a plurality of TFTs and energy storage devices. The first controlled terminal and the second controlled terminal of the signal generating module 10 are provided to be connected to the scan line L1 and the data line L2 corresponding to the pixel unit, so as to access the first scan signal SS1 and the data signal DS. The third controlled terminal is provided to connect with the first output terminal of the signal generating module 10 in the pixel unit to access the second scan signal SS2; and the input terminal may be connected to the power management circuit. The second scan signal SS2 may also have a high level and a low level, and the light-emitting driving module 20 may control each TFT therein to be conducted or turned off correspondingly according to the voltage levels of the first scan signal SS1 and the second scan signal SS2, so that the corresponding conducted TFT may be accessed to a data signal DS to charge the energy storage device. After the energy storage device is charged, the light-emitting driving module 20 may also make the correspondingly conducted TFT form a discharge circuit of the energy storage device according to the voltage levels of the first scan signal SS1 and the second scan signal SS2, so as to utilize the discharge voltage of the energy storage device to trigger the corresponding TFT to be conducted, and at the same time to communicate the input terminal and the output terminal of the light-emitting driving module 20, thereby writing the power supply voltage VDD into the light-emitting module 30 to drive the light-emitting module 30 to emit light.

It may be understood that, in the related art, each scan signal accessed to the light-emitting driving module 20 is output by the gate driver under the control of the timing controller 40, and is transmitted by different scan lines L1 respectively. In actual products, due to the influence of the error in the driving algorithm of the timing controller 40 and the hardware of the gate driver, the rising edge (rising waveform from low level to high level) and the falling edge (falling waveform from high level to low level) of each scan signal output by the gate driver will have a certain time, that is, the rising edge time and the falling edge time, and further affected by the process factors of each scan line L1, each scan line L1 will cause certain signal distortions to the transmitted scan signal during the transmission process, so that the rising edge time and falling edge time of each scan signal have different extensions, which therefore result in generating overlap part in the rising edge time and falling edge time of different scan signals. For a TFT, such as an N-type TFT, the TFT will be conducted when the voltage value of the gate voltage rises to reach the threshold voltage, and the TFT will be turned off when the voltage value of the voltage value of the gate voltage drops below the threshold voltage. Thus, when the rising edge time and falling delay time of the connected scan signals is overlapped, the two TFTs that should not be conducted simultaneously will be conducted at the same time, which will cause the current loop in the light-emitting drive circuit to be disordered, and thereby affecting the writing process of the power supply voltage VDD and the final luminous effect of the light-emitting module 30.

In the embodiments of the present application, the signal generating module 10 and the light-emitting driving module 20 are provided, and the switching device are used to be conducted or turned off through the signal generating module 10 to process the first scan signal SS1 into the second scan signal SS2 required by the light-emitting driving circuit. Since the conduction and turnoff of the switching device may effectively shorten the rising edge time and falling edge time, compared with the first scan signal SS1, the rising edge time and falling edge time of the second scan signal SS2 are shorter, thus reducing the overlap probability of the rising edge time and the falling edge time of the first scan signal SS1 and the second scan signal SS2, and reducing the probability that the overlap part affects the luminous effect of the pixel unit, thereby solving the problem that the TFT in the light-emitting drive circuit cannot be timely turned off, and improving the display effect and display stability of self-luminous panels such as OLED panels. In addition, since the signal generating module 10 is provided in the pixel driving circuit 2, that is, in each pixel unit, compared with being provided in the gate driver, the distortion to the second scan signal SS2 generated after the transmission process of the scan line L1 may be effectively avoided, which is beneficial to ensure that the light-emitting driving module 20 in each pixel unit is accessed to the second scan signal SS2 with a short rising or falling edge time output by the signal generating module 10. Besides, since one channel of scan signal needs one scan line L1 to transmit, the quantity of scan lines L1 in the present self-luminous panel is at least 2N, and N is the row quantity of the pixel array. However, in the embodiments of the present application, N scan lines L1 are required to drive a self-luminous panel with the same resolution to work. In other words, the embodiments of the present application may reduce the occupied area of the whole scan line L1 in the display panel 1, which is beneficial to the high-resolution design of the self-luminous panel.

Figure 2:
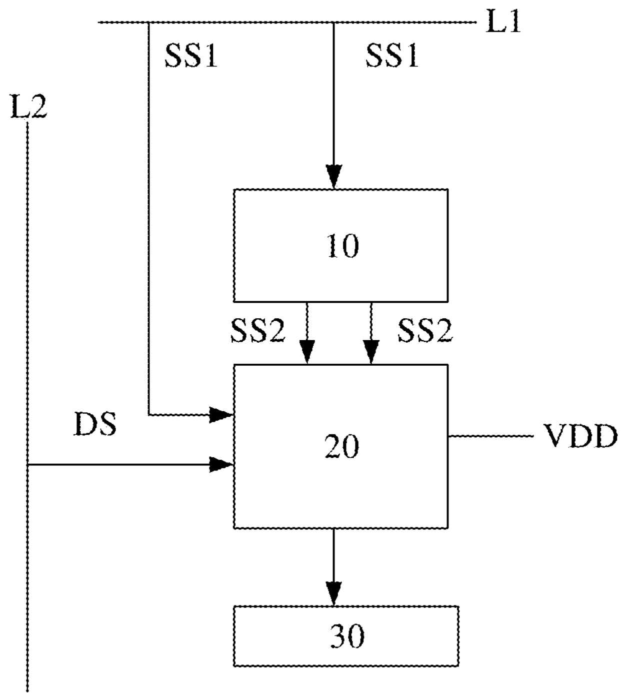
FIG. 2 is a schematic diagram of another module of the pixel driving circuit according to an embodiment of the present application.
Figure 3:
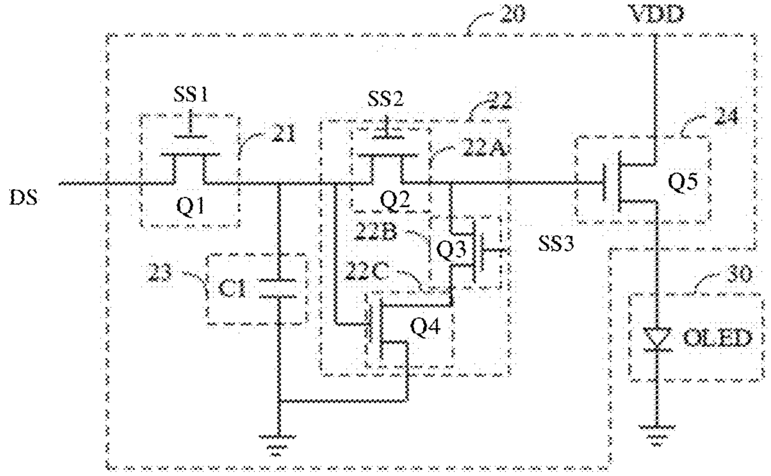
FIG. 3 is a schematic circuit diagram of a light-emitting driving module in the pixel drive circuit according to an embodiment of the present application.

As shown in FIG. 2 and FIG. 3, in an embodiment, the signal generating module 10 is further configured to generate a third scan signal SS3 according to the first scan signal SS1, and the third scan signal SS3 is output to a fourth controlled terminal of the light-emitting driving module 20 through the second output terminal;

the light-emitting driving module 20 includes:

the data writing module 21, the controlled terminal and the input terminal of the data writing module 21 are connected to the first controlled terminal and the second controlled terminal of the light-emitting driving module 20 in one-to-one correspondence;

the charge and discharge control module 22, the first controlled terminal and the second controlled terminal of the charge and discharge control module 22 are connected to the third controlled terminal and the fourth controlled terminal of the light-emitting driving module 20 in one-to-one correspondence, and the input terminal of the charge and discharge control module 22 is connected to the output terminal of data writing module 21;

the energy storage module 23 connected between the output terminal of the data writing module 21 and the input terminal of the charge and discharge control module 22; and, the driving module 24, the controlled terminal of the driving module 24 is connected to the output terminal of the charge and discharge control module 22, and the input terminal and the output terminal of the driving module 24 are connected to the input terminal and output terminal of the light-emitting driving module 20 in one-to-one correspondence.

In this embodiment, the signal generating module 10 may include two signal generating sub-modules 101, the input terminals of the two signal generating sub-modules 101 are configured to connect to the scan line L1 corresponding to the pixel unit, so as to respectively access to the first scan signal SS1, The two signal generating sub-modules 101 are configured to respectively control the corresponding switching devices therein to be conducted or turned off according to the level of the first scan signal SS1 to perform corresponding signal processing on the accessed first scan signal SS1, and the signal-processed first scan signal SS1*s* are respectively output as the second scan signal SS2 and the third scan signal SS3.

The light-emitting driving module 20 is configured to write the power supply voltage VDD into the light-emitting module 30 according to the received first scan signal SS1, second scan signal SS2, third scan signal SS3 and data signal DS, so as to drive the light-emitting module 30 to emit light. The data writing module 21 may be turned on when receiving the first scan signal SS1 at one level, and may be turned off when receiving the first scan signal SS1 at another level. When turned on, the data writing module 21 may further be accessed to the data signal DS and output the data signal DS to the energy storage module 23 to charge the energy storage module 23. The charging and discharging control module 22 may be turned on when receiving the second scan signal SS2 and the third scan signal SS3 at a corresponding level respectively, and may be turned off when receiving the second scan signal SS2 and the third scan signal SS3 at another level respectively. When the charging and discharging control module 22 is turned on, the energy storage module 23 discharge and output the discharge voltage to the controlled terminal of the driving module 24. The driving module 24 may be turned on when the voltage value of the controlled terminal voltage reaches the threshold voltage, may be turned off when the voltage value of the controlled terminal voltage is lower than the threshold voltage, and may output the power supply voltage VDD to the light-emitting module 30 when turned on, so as to drive the light-emitting module 30 to emit light.

Figure 6:
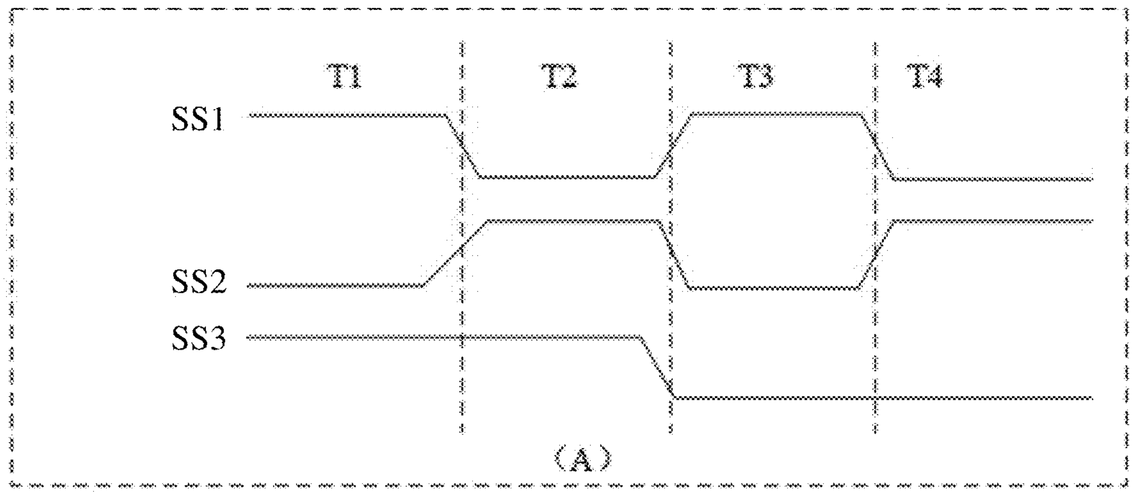
FIG. 6 is a schematic diagram of waveforms of scan signals connected to an existing pixel driving circuit.

It may be understood that, as shown in FIG. 3 and FIG. 6, the charging and discharging control module 22 and the data writing module 21 cannot be conducted simultaneously, the data writing module 21 is turned on when the second scan signal SS2 and the third scan signal SS3 is at a corresponding level, and the data writing module 21 is turned off when the second scan signal SS2 and the third scan signal SS3 are at another level. Therefore, the raising edge time and the falling edge time requirement of the first scan signal SS1, the second scan signal SS2 and the third scan signal SS3 are more stringent. However, due to the embodiments of the present application, compared with the first scan signal SS1, the rising edge time and the falling edge time of the third scan signal SS3 are also shorter, thus reducing the overlap probability of the rising edge time and the falling edge time of at least any two of the first scan signal SS1, the second scan signal SS2 and the third scan signal SS3, which will help to further improve the display effect and display stability of self-luminous panels such as organic light emitting diode (OLED) panels. The light-emitting driving module 20 may further be configured to be accessed to more than three channels of scan signals, and the signal generating module 10 may be accessed to one channel of the scan signals, and the rest channels of scan signal required by the light-emitting driving module 20 are generated according to the accessed scan signal, which may not be repeated here.

Further, the charging and discharging control module 22 includes a first switch module 22A, a second switch module 22B, and a third switch module 22C.

A controlled terminal, an input terminal, and an output terminal of the first switch module 22A are respectively connected to a first controlled terminal, an input terminal, and an output terminal of the charge and discharge control module 22 in one-to-one correspondence.

A controlled terminal of the second switch module 22B is connected to a second controlled terminal of the charge and discharge control module 22, and an input terminal of the second switch module 22B is connected to the output terminal of the first switch module 22A.

A controlled terminal of the third switch module is connected to the input terminal of the first switch module 22A, an input terminal of the third switch module is connected to an output terminal of the second switch module 22B, and an output terminal of the third switch module 22C is grounded.

In an embodiment, the charging and discharging control module 22 may be 5 transistors 1 capacitance (5T1C) circuit structure. The data writing module 21 may include a first TFT Q1, the first switch module 22A may include a second TFT Q2, the second switch module 22B may include a third TFT Q3, and the third switch module 22C may include a fourth TFT Q4, the driving module 24 may include a fifth TFT Q5, and the energy storage module 23 may include a first capacitor C1. One end of the first capacitor C1 is connected to the path between the data writing module 21 and the charging and discharging control module 22, and another end of the first capacitor C1 is grounded.

In an embodiment, the working phases of the light-emitting driving module 20 include the initial energy storage phase T1, the discharge phase T2, the secondary energy storage phase T3, and the light-emitting driving phase T4 executed in sequence.

In the initial energy storage phase T1, the data writing module 21 is turned on, and the charging and discharging control module 22 is turned off.

In the discharge phase T2, the data writing module 21 is turned off, the charging and discharging control module 22 is turned on, and the driving module 24 is turned off.

In the secondary energy storage phase T3, the data writing module 21 is turned on, and the charging and discharging control module 22 is turned off.

In the light-emitting driving phase T4, the data writing module 21 is turned off, and the charging and discharging control module 22 and the driving module 24 are turned on.

In the embodiment shown in FIG. 3, the first TFT Q1 to the fifth TFT Q5 are all N-type TFT. Taking the embodiment shown in FIG. 3 as an example, the specific work process of the phase is illustrated in detail.

When the data writing module 21 receives the high-level first scan signal SS1 for the first time in the working phase, the light-emitting driving module 20 enters the initial energy storage phase T1. In this phase, the first TFT Q1 is turned on, and the data writing module 21 is turned on to output a high-level data signal DS to the first capacitor C1, so that the terminal voltage of the first capacitor C1 may be charged to V. When the second scan signal SS2 is at low level, the second TFT Q2 is turned off, so as to disconnect the first capacitor C1 and the gate of the fifth TFT Q5. When the third scan signal SS3 is at high level, the third TFT Q3 and the fifth TFT Q5 are turned on, so as to pull down the voltage value of the gate voltage of the fifth TFT Q5 to the ground voltage, and the charge and discharge control module 22 is in an off state. The fifth TFT Q5 is turned off, the driving module 24 is turned off, and the light-emitting module 30 does not emit light.

When the first scan signal SS1 is switched from high level to low level, and the second scan signal SS2 is switched from low level to high level, the light-emitting driving module 20 enters the discharge phase T2, and the third scan signal SS3 maintains high level. In this phase, the first TFT Q1 is turned off, and the data writing module 21 is turned off, so that the first capacitor C1 stops charging and storing energy. The second TFT Q2 and the fourth TFT Q4 are all conducted, and the charging and discharging control module 22 is turned on, so that the first capacitor C1 may be conducted to the fourth TFT Q4 through the conducted second TFT Q2 to form a discharge circuit. At this time, the fifth TFT Q5 is still in the off state, the driving module 24 is turned off, and the light-emitting module 30 does not emit light. In this phase, as the discharge process proceeds, the terminal voltage of the first capacitor C1 drops to Vth at the end of the discharge phase T2. Vth may be corresponded to the threshold voltage of the fifth TFT Q5, and Vth is lower than V.

When the first scan signal SS1 is switched from low level to high level, and when the second scan signal SS2 is switched from high level to low level, the third scan signal SS3 is switched from high level to low level, and the light-emitting driving module 20 enters the second energy storage phase T3. In this phase, the first TFT Q1 is conducted, and the data writing module 21 is turned on to output a high-level data signal DS to the first capacitor C1 to recharge the terminal voltage of the first capacitor C1 to V+Vth. At this time, although the fourth TFT Q4 is turned on, the second TFT Q2 and the third TFT Q3 are turned off, and the charging and discharging control module 22 is in an off state. The fifth TFT Q5 is still in the off state, the driving module 24 is turned off, and the light-emitting module 30 does not emit light.

When the first scan signal SS1 is switched from low level to high level again, and the second scan signal SS2 is switched from high level to low level, the light-emitting driving module 20 enters the light-emitting driving phase T4, and the third scan signal SS3 maintains low level. In this phase, the first TFT Q1 is turned off, the data writing module 21 is turned off, and the first capacitor C1 stops charging and storing energy. Both the second TFT Q2 and the fourth TFT Q4 are turned on, so that the first capacitor C1 may be turned on by the second TFT Q2 to output the discharge voltage V+Vth to the gate of the fifth TFT Q5. At this time, the third TFT Q3 is turned off, the gate voltage of the fifth TFT Q5 is not pulled down, and the charge and discharge control module 22 is turned on. The fifth TFT Q5 is conducted, and the driving module 24 is turned on, so as to drive the light-emitting module 30 to emit light.

In the embodiments of the present application, twice energy storage and single discharge are designed in the light-emitting driving module 20, which may ensure that the controlled terminal voltage of the fifth TFT Q5 is V+Vth in the light-emitting driving phase T4. In terms of energy storage design, the conduction degree and conduction time of the fifth TFT Q5 in the light-emitting driving phase T4 are effectively ensured, which is beneficial to improve the luminous effect and working stability of the light-emitting module 30.

It may be understood from the above specific working process that once two or three TFTs that should not be conducted simultaneously are conducted at the same time, the luminous effect of the light-emitting module 30 will be affected. For example: in the initial energy storage phase T1, if the second TFT Q2 and the third TFT Q3 are turned on, a discharge circuit of the first capacitor C1 to ground will be formed, so that the terminal voltage of the first capacitor C1 after the initial energy storage phase is lower than V, and the gate voltage value of the fifth thin-film transistor Q5 is lower than V+Vth in the light-emitting driving phase T4, so that the power supply current output by the fifth thin-film transistor Q5 to the light-emitting module 30 is decreased and the luminous brightness of the light-emitting module 30 is reduced. In the above working phases, there are many situations where two or three TFTs are conducted simultaneously and affect the final luminous effect of the light-emitting module 30, which are not repeated here, and is also the difficulty of applying the three scan signals driving solution for pixel units in self-luminous panels. However, the technical solution of the present application may effectively reduce the occurrence probability of the above situations, so as to improve the display stability of the self-luminous panel.

Further, as shown in FIG. 6, the first scan signal SS1 is sequentially at the first level, the second level, the first level, and a second level in the initial energy storage phase T1, the discharge phase T2, the secondary energy storage phase T3, and the light-emitting driving phase T4.

The level of the second scan signal SS2 and the first scan signal SS1 in the initial energy storage phase T1, the discharge phase T2, the secondary energy storage phase T3, and the light-emitting driving phase T4 are opposite.

The third scan signal SS3 is sequentially at the first level, the first level, the second level, and the second level in sequence in the initial energy storage phase T1, the discharge phase T2, the secondary energy storage phase T3, and the light-emitting driving phase T4.

The first level and the second level are opposite levels.

In an embodiment, one of the first level and the second level is a high level, and another is a low level. In the embodiment shown in FIG. 3, the first TFT Q1 to the fifth TFT Q5 are all N-type TFT, the first level is high level, and the second level is low level. It may be understood that the probability that a plurality of TFTs appear to be conducted simultaneously is proportional to the times at which the level of the multi-channel scan signals is switched at the same time. However, in the light-emitting driving module 20 and the working phase thereof provided by the present application, the quantity of the times at which two scan signals switch levels simultaneously is two, and the quantity of the times at which three scan signals switch levels simultaneously may be regarded as one, which effectively reduces the quantity of simultaneous switching times of a plurality of scan signals, thereby reducing the probability that a plurality of TFTs are conducted simultaneously through the mutual cooperation of the circuit structure and the control method.

Figure 4:
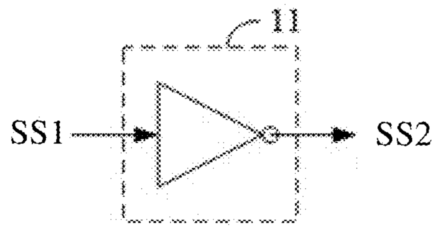
FIG. 4 is a schematic circuit diagram of a signal generating circuit in the pixel driving circuit according to an embodiment of the present application.

In an embodiment, as shown in FIG. 4, the signal generating module 10 includes: an inverter 11.

An input terminal and an output terminal of the inverter 11 are connected to the input terminal and the first output terminal of the signal generating module 10 in one-to-one correspondence, and the inverter 11 is configured to invert and output the first scan signal SS1 as the second scan signal SS2.

The inverter 11 is a signal generating sub-module 101 in the signal generating module 10, and the inverter 11 may be constructed by switching devices such as a TFT, a metal-oxide-silicon-field effect transistor (MOS), and a triode. The inverter 11 may perform a level inversion process on the accessed first scan signal SS1, and may output the level inverted first scan signal SS1 as the second scan signal SS2. Specifically, when the first scan signal SS1 of the first level is accessed, the second scan signal SS2 at the second level is output; when the first scan signal SS1 of the second level is accessed, the second scan signal SS2 at the first level is output. Since the inverter 11 may optimize the rising edge and the falling edge of the signal during the inversion process, the rising edge time and the falling edge time of the second scan signal SS2 may be shortened.

Figure 5:
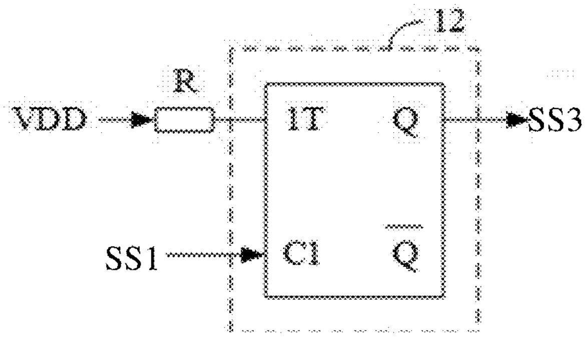
FIG. 5 is another schematic circuit diagram of a signal generating circuit in the pixel driving circuit according to an embodiment of the present application.

In an embodiment, as shown in FIG. 5, the signal generating module 10 also includes a trigger 12.

A first input terminal of the trigger 12 is configured to access the power supply voltage VDD, a second input terminal and an output terminal of the trigger 12 are connected to an input terminal and a second output terminal of the signal generating module 10 in one-to-one correspondence, and the trigger 12 is configured to output the power supply voltage VDD as the second scan signal SS2 according to the first scan signal SS1.

The trigger 12 is another signal generating sub-module 101 in the signal generating module 10, and the trigger 12 may be realized by one or a combination of an RS trigger, a JK trigger, a T trigger, and a D trigger, which is not limited here. In an embodiment, the trigger 12 may be a T trigger, and the first input terminal, the second input terminal, and the output terminal of the trigger 12 may be respectively the T input terminal, the clock input terminal, and the Q output terminal of the T trigger, at this time, the first scan signal SS1 is used as the clock input of the T trigger. The T input terminal is configured to be connected to the high-level power supply voltage VDD through the resistor R. When the T trigger receives the first scan signal SS1 at low lever, the power supply voltage VDD at high level is directly used as the third scan signal SS3 at high level. Every time the first scan signal SS1 at high level is received, the T trigger inverts the level of the output signal once. As shown in FIG. 5, in the initial energy storage phase T1, the T trigger outputs a third scan signal SS3 at high level; in the secondary energy storage phase T3, the T trigger receives the first scan signal SS1 at high level again, and the T trigger outputs a third scan signal SS3 at low level. In addition, the area required for the configuration of the inverter 11 and the trigger 12 is relatively small, so it is also convenient to integrate and configure in each pixel unit.

As shown in FIG. 6 and FIG. 3, FIG. 6 shows the signal waveforms of the first scan signal SS1, the second scan signal SS2 and the third scan signal SS3 output in the related art. In order to ensure that the third scan signal SS3 is at low level in the secondary energy storage phase T3, it is necessary to switch the level of the third scan signal SS3 in advance in the discharge phase T2, and since switching the third scan signal SS3 to low level too early or too late will respectively affect the discharge effect and the recharge effect of the first capacitor C1, it is often necessary to perform a lot of debugging on the self-luminous panel to ensure the display effect. The technical solution of the present application uses the feature that the output level of the trigger 12 may be quickly switched to automatically switch the third scan signal SS3 from high level to low level while the first scan signal SS1 is switched from low level to high level. Therefore, there is no need for excessive debugging processes, which is conducive to improving the mass production efficiency of self-luminous panels.

The application further provides a method for controlling a display panel 1.

Figure 7:
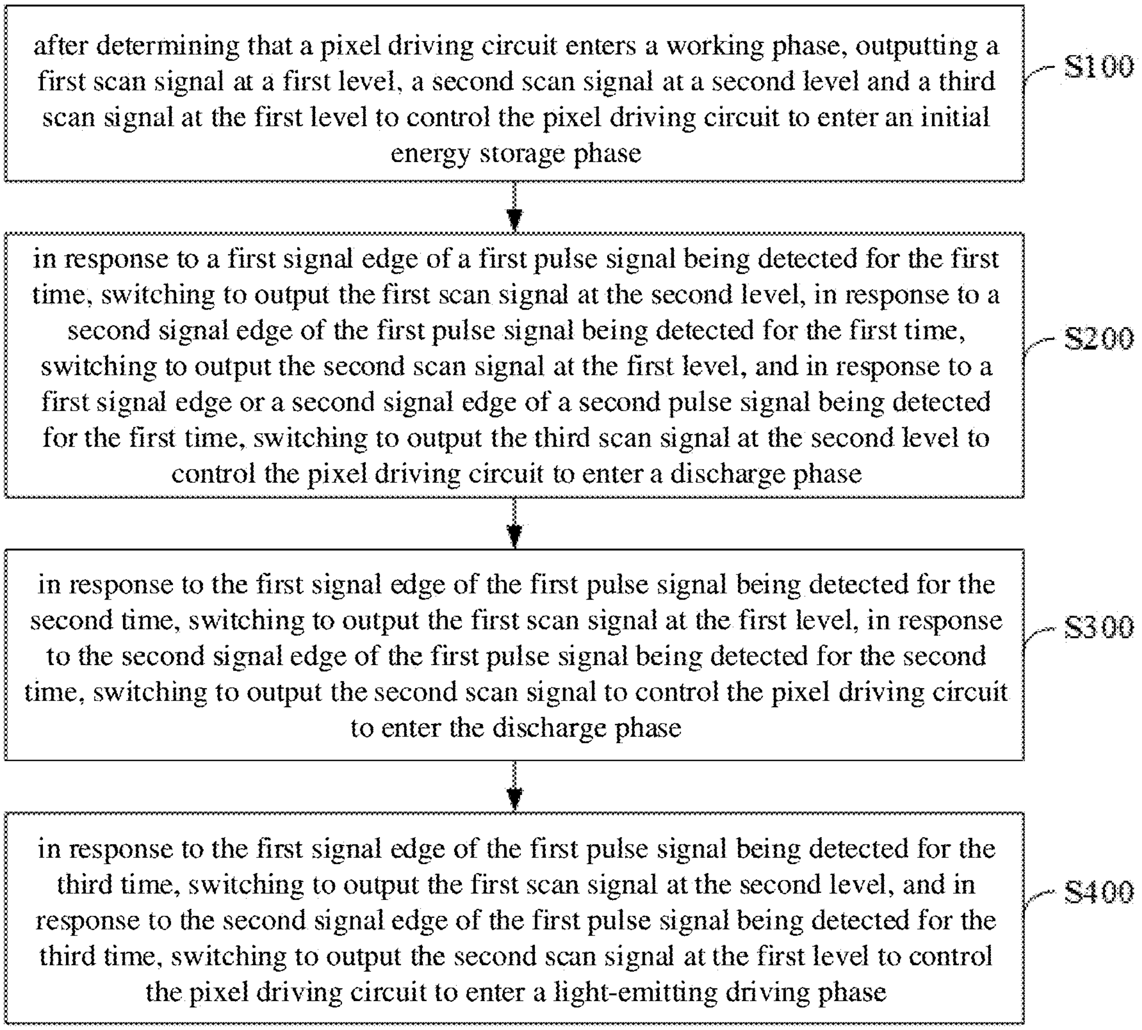
FIG. 7 is a schematic flowchart of a control method for a display panel according to an embodiment of the present application.

As shown in FIG. 7, in an embodiment, the control method of the display panel 1 includes:

S100, after determining that a pixel driving circuit 2 enters a working phase, outputting a first scan signal SS1 at a first level, a second scan signal SS2 at a second level and a third scan signal SS3 at the first level to control the pixel driving circuit 2 to enter an initial energy storage phase T1;

S200, in response to a first signal edge of a first pulse signal TP1 being detected for the first time, switching to output the first scan signal SS1 at the second level, in response to a second signal edge of the first pulse signal TP1 being detected for the first time, switching to output the second scan signal SS2 at the first level, and in response to a first signal edge or a second signal edge of a second pulse signal being detected for the first time, switching to output the third scan signal SS3 at the second level to control the pixel driving circuit 2 to enter a discharge phase T2;

S300, in response to the first signal edge of the first pulse signal TP1 being detected for the second time, switching to output the first scan signal SS1 at the first level, in response to the second signal edge of the first pulse signal TP1 being detected for the second time, switching to output the second scan signal SS2 to control the pixel driving circuit 2 to enter the discharge phase T2;

S400, in response to the first signal edge of the first pulse signal TP1 being detected for the third time, switching to output the first scan signal SS1 at the second level, and in response to the second signal edge of the first pulse signal TP1 being detected for the third time, switching to output the second scan signal SS2 at the first level to control the pixel driving circuit 2 to enter a light-emitting driving phase T4; and one of the first signal edge and the second signal edge is a rising edge, and the other is a falling edge.

In this embodiment, the display panel 1 may include a light-emitting module 30, a pixel driving circuit 2 and a timing controller 40. The input terminal of the pixel driving circuit 2 is configured to access the power supply voltage VDD, and the output terminal of the pixel driving circuit 2 is connected to the light-emitting module 30. The four output terminals of the timing controller 40 are connected to the four controlled terminals of the pixel driving circuit 2 in one-to-one correspondence, and the four output terminals of the timing controller 40 are configured to output the first scan signal SS1, the second scan signal SS2, and the second scan signal SS2 respectively to the pixel driving circuit 2 to drive the light-emitting module 30 to emit light. Specifically, the four output terminals of the timing controller 40 are respectively connected to the four controlled terminals of the light-emitting driving module 20 in the pixel driving circuit 2 through three scan lines L1 and one data line L2 in one-to-one correspondence. The display panel 1 may also be provided with two pulse signal generating modules, the two pulse signal generating modules are respectively connected to the timing controller 40, and the two pulse signal generating modules are configured to generate one channel of pulse signal respectively, that is, the first pulse signal TP1 and the second pulse signal TP1. Two pulse signals are output to the timing controller 40 respectively, each pulse signal may include multiple pulses with rising edges and falling edges. The timing controller 40 may perform level detection on the two accessed pulse signals, may determine the rising edge of the pulse signal when any channels of the pulse signal is switched from low level to high level; and may determine the falling edge of the pulse signal when any channels of the pulse signal is switched from high level to low level.

The execution subject of the control method of the display panel 1 of the present application may be a timing controller. The pixel drive circuit may include: the data writing module 21, the first switch module 22A, the second switch module 22B, the third switch module 22C, the energy storage module 23 and the driving module 24. The circuit structure of each functional module in the pixel drive circuit may be as shown in an embodiment above, details will not be repeated here.

Figure 8:
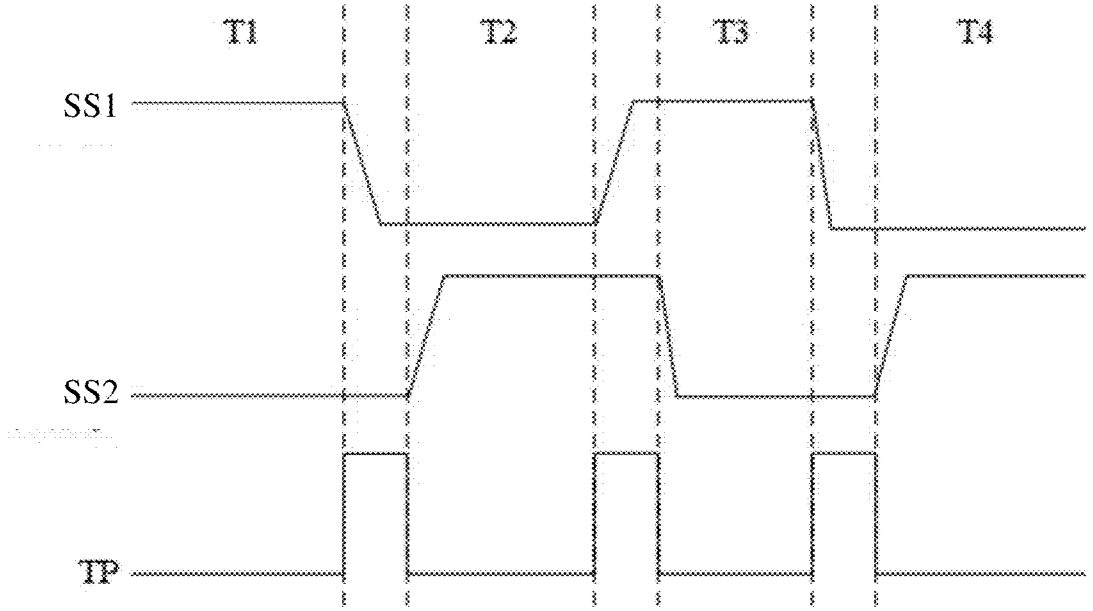
FIG. 8 is a schematic waveform diagram of signals related to the control method of the display panel according to an embodiment of the present application.

Here, taking the first signal edge being a rising edge and the second signal edge being a falling edge as an example, the method for controlling the display panel 1 of the present application is explained in detail. When the display panel 1 is working, the pixel driving circuit 2 may include a plurality of cyclically executed working frame periods under the control of the timing controller 40, and each working period may include a working phase. As shown in FIG. 8, the timing controller 40 may output a first scan signal SS1 at the first level, a second scan signal SS2 at the second level, and a third scan signal SS3 at the first level after determining that the pixel driving circuit 2 enters a working period to control the data writing module 21 to turn on and the charging and discharging control module 22 to turn off, thereby controlling the pixel driving circuit 2 to enter the initial energy storage phase T1.

After the pixel drive circuit enters the initial energy storage phase T1, in response to a rising edge of the first pulse signal TP1 being detected by the timing controller 40, switching to output the first scan signal SS1 at the second level; in response to a falling edge of the first pulse signal TP1 being detected, switching to output the second scan signal SS2 at the first level; in response to a rising or a falling edge of the second pulse signal being detected, switching to output the third scan signal SS3 at the second level to control the data writing module 21 to be turned off, and to control the charge and discharge control module 22 to be turned on, and to control the pixel driving circuit 2 to enter a discharge phase T2. It should be noted that, at this time, the first signal edge of the second pulse signal is provided between the falling edge of the first pulse and the rising edge of the second pulse in the first signal pulse, and the third scan signal SS3 has been switched to the second level before the rising edge of the second pulse in the first signal pulse comes.

After the pixel drive circuit enters the initial energy storage phase T1, in response to the rising edge of the first pulse signal TP1 being detected by the timing controller 40 for the second time, switching to output the first scan signal SS1 at the first level; in response to the falling edge of the first pulse signal TP1 being detected, switching to output the second scan signal SS2 at the second level to control the data writing module 21 to be turned on, and to control the charging and discharging control module 22 to be turned off, and to control the pixel driving circuit 2 to enter the discharge phase T2.

After the pixel drive circuit enters the discharge phase T2, in response to the rising edge of the first pulse signal TP1 being detected by the timing controller 40, switching to output the first scan signal SS1 at the second level; in response to the falling edge of the first pulse signal TP1 being detected, switching to output the second scan signal SS2 at the first level to control the data writing module 21 to be turned off, to control the charging and discharging control module 22 and the driving module 24 to be turned on, and to control the pixel driving circuit 2 to enter the light-emitting driving phase T4.

The control method of the display panel 1 of the present application introduces two channels of pulse signals, and the levels of the three channels of the scan signals are switched through the timing controller 40 according to the rising edge and the falling edge of the pulses in the two channels of the pulse signals, so as to utilize the interval time between the rising edge and the falling edge of the same pulse to stagger the level switching time of the three channels of the scan signals. Therefore, the probability of the overlap part generated between the rising edge time and the falling edge time of each channel of the scan signals is reduced, and then the probability that the overlap part affects the luminous effect of the pixel unit is reduced, thereby solving the problem that the display effect of the display panel 1 is affected since the TFT in the light-emitting drive circuit cannot be timely turned off.

Figure 9:
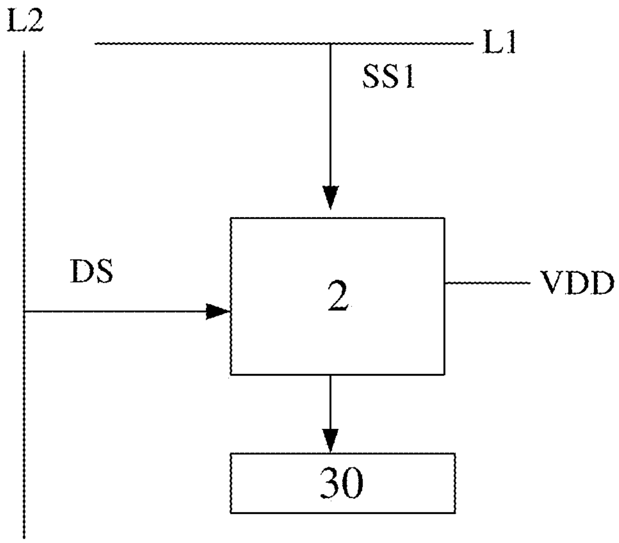
FIG. 9 is a schematic diagram of a module of a display panel according to an embodiment of the present application.

The present application further provides a display panel 1. As shown in FIG. 9, the display panel 1 includes a light-emitting module 30, a data line L2, a scan line L1, and a pixel driving circuit 2. The specific structure of the pixel driving circuit 2 may refer to an embodiment. Since the display panel 1 is applied with all the technical solutions of the above-mentioned embodiment, at least all the beneficial effects brought by the technical solutions of the above-mentioned embodiment are possessed, and details will not be repeated here.

The light-emitting module 30 includes an organic light-emitting device, the anode of the organic light-emitting device is configured to access to the power supply voltage VDD output by the pixel driving circuit 2, and the cathode of the organic light-emitting device is grounded. The scan line L1 is configured to access to and transmit the first scan signal SS1 output by the gate driver. The data line L2 is configured to access to and transmit the data signal DS output by the source driver. The pixel driving circuit 2 is respectively connected to the light-emitting module 30, the data line L2 and the scan line L1.

Figure 10:
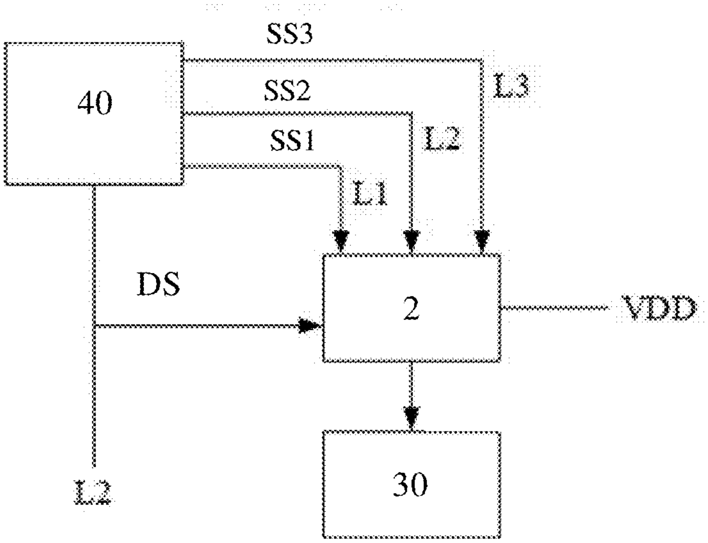
FIG. 10 is a schematic diagram of modules of a display panel according to an embodiment of the present application.

The present application further provides a display panel 1. As shown in FIG. 10, the display panel 1 includes a light-emitting module 30, a pixel driving circuit 2, and a timing controller 40. The timing controller 40 is configured to implement the control method of the display panel 1. The specific operations of the method may refer to the above embodiment. Since this display panel 1 is applied with all the technical solutions of the above embodiment, it at least has all the beneficial effects brought by the technical solutions of the above embodiment, and details will not be repeated here.

The light-emitting module 30 includes an organic light-emitting device, the anode of the organic light-emitting device is configured to access to the power supply voltage VDD output by the pixel driving circuit 2, and the cathode of the organic light-emitting device is grounded. The pixel driving circuit 2 is connected to the light-emitting module 30; the timing controller 40 is connected to the four controlled terminals of the pixel driving circuit 2, and the timing controller 40 is configured to respectively output the first scan signal SS1, the second scan signal SS2, the third scan signal SS3 and the data signal DS to the pixel driving circuit 2 through three scan lines L1 and one data line L2, to drive the light-emitting module 30 to emit light. The display panel 1 may further include a gate driver and a source driver, and the gate driver is configured to respectively output the first scan signal SS1, the second scan signal SS2, and the third scan signal SS3 to the pixel driving circuit 2 through three scan lines L1 under a control of the timing controller 40. The source driver is configured to output the data signal DS to the pixel driving circuit 2 through the data line L2 under the control of the timing controller 40.

The above are only some embodiments of the present application, not to limit the scope of the present application. Any equivalent structural transformation made by using the content of the specification of the present application and the drawings under the inventive concept of the present application, or direct/indirect application in other related technical fields are included in the scope of the present application.

What is claimed is:

1. A pixel driving circuit, applied to a display panel, the display panel comprising: a data line, a scan line and a light-emitting module, the scan line is configured to access and transmit a first scan signal, and a source line is configured to access and transmit data signals, wherein the pixel driving circuit comprises:

a signal generating module, wherein an input terminal of the signal generating module is connected to the scan line, the signal generating module is configured to generate a second scan signal according to the first scan signal, and the second scan signal is output from a first output terminal; and a light-emitting driving module, wherein a first controlled terminal, a second controlled terminal, and a third controlled terminal of the light-emitting driving module are connected to the scan line, the data line, and a first output terminal of the signal generating module in one-to-one correspondence, an input terminal of the light-emitting driving module is configured to access a power supply voltage, and an output terminal of the light-emitting driving module is connected to the light-emitting module, wherein the light-emitting driving module is configured to write the power supply voltage into the light-emitting module according to a received first scan signal, the second scan signal and the data signal, so as to drive the light-emitting module to emit light;

the signal generating module is further configured to generate a third scan signal according to the first scan signal, and the third scan signal is output to a fourth controlled terminal of the light-emitting driving module through a second output terminal of the signal generating module;

the light-emitting driving module comprises:

a data writing module, a controlled terminal and an input terminal of the data writing module are connected to the first controlled terminal and the second controlled terminal of the light-emitting driving module in one-to-one correspondence;

a charge and discharge control module, a first controlled terminal and a second controlled terminal of the charge and discharge control module are connected to the third controlled terminal and the fourth controlled terminal of the light-emitting driving module in one-to-one correspondence, and an input terminal of the charge and discharge control module is connected to an output terminal of the data writing module;

an energy storage module, wherein a first electrode of the energy storage module is connected between the output terminal of the data writing module and the input terminal of the charge and discharge control module; and a driving module, a controlled terminal of the driving module is connected to an output terminal of the charge and discharge control module, and an input terminal and an output terminal of the driving module are connected to the input terminal and the output terminal of the light-emitting driving module in one-to-one correspondence;

wherein the charging and discharging control module comprises:

a first switch module, wherein a controlled terminal, an input terminal, and an output terminal of the first switch module are respectively connected to the first controlled terminal, the input terminal, and the output terminal of the charge and discharge control module in one-to-one correspondence;

a second switch module, wherein a controlled terminal of the second switch module is connected to a second controlled terminal of the charging and discharging control module, and an input terminal of the second switch module is connected to the output terminal of the first switch module; and a third switch module, wherein a controlled terminal of the third switch module is connected to the input terminal of the first switch module, an input terminal of the third switch module is connected to an output terminal of the second switch module, and an output terminal of the third switch module is grounded.

2. The pixel driving circuit according to claim 1, wherein the signal generating module comprises two signal generating sub-modules, and input terminals of the two signal generating sub-modules are both configured to be connected to the scan lines corresponding to pixel units to access the first scan signal respectively, the two signal generating sub-modules are configured to respectively control a corresponding switching device to turn on or off according to a level of the first scan signal to perform a corresponding signal processing on an accessed first scan signal.

3. The pixel driving circuit according to claim 2, wherein the signal generating module comprises:

an inverter, the inverter is one of the two signal generating sub-modules in the signal generating module, an input terminal and an output terminal of the inverter are connected to the input terminal and the first output terminal of the signal generating module in one-to-one correspondence, and the inverter is configured to invert and output the first scan signal as the second scan signal.

4. The pixel driving circuit according to claim 3, wherein the signal generating module further comprises:

a trigger, the trigger is the other of the two signal generating sub-modules in the signal generating module, a first input terminal of the trigger is configured to access the power supply voltage, a second input terminal and an output terminal of the trigger are connected to an input terminal and the second output terminal of the signal generating module in one-to-one correspondence, and the trigger is configured to output the power supply voltage as the second scan signal according to the first scan signal.

5. The pixel driving circuit according to claim 4, wherein the inverter comprises a switching device, a thin film transistor (TFT), a metal-oxide-silicon-field effect transistor (MOS), or a triode; the trigger comprises one of an RS trigger, a JK trigger, a T trigger, or a D trigger or a combination thereof.

6. The pixel driving circuit according to claim 1, wherein a working phase of the light-emitting driving module comprises an initial energy storage phase, a discharge phase, a secondary energy storage phase, and a light-emitting driving phase executed in sequence;

in the initial energy storage phase, the data writing module is turned on, and the charging and discharging control module is turned off;

in the discharge phase, the data writing module is turned off, the charging and discharging control module is turned on, and the driving module is turned off;

in the secondary energy storage phase, the data writing module is turned on, and the charging and discharging control module is turned off; and in the light-emitting driving phase, the data writing module is turned off, and the charging and discharging control module and the driving module are turned on.

7. The pixel driving circuit according to claim 6, wherein the first scan signal is sequentially at a first level, a second level, a first level, and a second level in the initial energy storage phase, the discharge phase, the secondary energy storage phase, and the light-emitting driving phase;

level of the second scan signal and the first scan signal in the initial energy storage phase, the discharge phase, the secondary energy storage phase, and the light-emitting driving phase are opposite;

the third scan signal is sequentially at the first level, the first level, the second level, and the second level in the initial energy storage phase, the discharge phase, the secondary energy storage phase, and the light-emitting driving phase; and wherein the first level and the second level are opposite levels.

8. The pixel driving circuit according to claim 7, wherein the charging and discharging control module and the data writing module are not conducted simultaneously, the data writing module is turned on when the second scan signal and the third scan signal are at a same level, and the data writing module is turned off when the second scan signal and the third scan signal are at another level.

9. A method for controlling a display panel, comprising:

after determining that a pixel driving circuit enters a working phase, outputting a first scan signal at a first level, a second scan signal at a second level and a third scan signal at the first level to control the pixel driving circuit to enter an initial energy storage phase;

after the initial energy storage phase, outputting the first scan signal at the second level, the second scan signal at the first level and the third scan signal at the first level to control the pixel driving circuit to enter a discharge phase;

after the discharge phase, outputting the first scan signal at the first level, the second scan signal at the second level and the third scan signal at the second level to control the pixel driving circuit to enter a second energy storage phase; and after the second energy storage phase, outputting the first scan signal at the second level, the second scan signal at the first level and the third scan signal at the second level to control the pixel driving circuit to enter a light-emitting driving phase.

10. A display panel, configured to realize a control method of the display panel, comprising:

a light-emitting module;

a pixel driving circuit connected to the light-emitting module; and a timing controller connected to four controlled terminals of the pixel driving circuit, wherein the timing controller is configured to output a first scan signal, a second scan signal, a third scan signal and a data signal to the pixel driving circuit for controlling the pixel driving circuit to drive the light-emitting module to emit light, the display panel comprises a gate driver and a source driver, and the gate driver is configured to respectively output the first scan signal, the second scan signal, and the third scan signal to the pixel driving circuit through three scan lines under a control of the timing controller;

the source driver is configured to output the data signal to the pixel driving circuit through the data line under a control of the timing controller;

an execution subject of the control method is the timing controller, after the pixel driving circuit is determined through the timing controller to enter a working phase, outputting a first scan signal at a first level, a second scan signal at a second level and a third scan signal at the first level to control the pixel driving circuit to enter an initial energy storage phase;

after the initial energy storage phase, outputting the first scan signal at the second level, the second scan signal at the first level and the third scan signal at the first level to control the pixel driving circuit to enter a discharge phase;

after the discharge phase, outputting the first scan signal at the first level, the second scan signal at the second level and the third scan signal at the second level to control the pixel driving circuit to enter a second energy storage phase; and after the second energy storage phase, outputting the first scan signal at the second level, the second scan signal at the first level and the third scan signal at the second level to control the pixel driving circuit to enter a light-emitting driving phase.

* * * * *